(12) United States Patent
Tsuchiya et al.

(10) Patent No.: US 11,119,796 B2
(45) Date of Patent: Sep. 14, 2021

(54) INFORMATION PROCESSING APPARATUS AND DATA COPYING METHOD

(71) Applicant: SONY INTERACTIVE ENTERTAINMENT INC., Tokyo (JP)

(72) Inventors: Akitsugu Tsuchiya, Kanagawa (JP); Masaki Takahashi, Kanagawa (JP); Atsushi Hamano, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 191 days.

(21) Appl. No.: 16/094,632

(22) PCT Filed: Feb. 22, 2017

(86) PCT No.: PCT/JP2017/006671
§ 371 (c)(1),
(2) Date: Oct. 18, 2018

(87) PCT Pub. No.: WO2017/187741
PCT Pub. Date: Nov. 2, 2017

(65) Prior Publication Data
US 2019/0121654 A1  Apr. 25, 2019

(30) Foreign Application Priority Data

Apr. 28, 2016 (JP) .............................. JP2016-091147

(51) Int. Cl.
*G06F 3/06* (2006.01)
*G06F 40/58* (2020.01)
(Continued)

(52) U.S. Cl.
CPC .............. *G06F 9/454* (2018.02); *A63F 13/77* (2014.09); *A63F 13/79* (2014.09); *G06F 3/0484* (2013.01);
(Continued)

(58) Field of Classification Search
CPC ..... G06F 9/454; G06F 12/0868; G06F 3/0484
See application file for complete search history.

(56) References Cited

U.S. PATENT DOCUMENTS

2003/0014237 A1* 1/2003 Macklin ................. G06F 40/58
704/2
2008/0010594 A1 1/2008 Hoerentrup et al.
(Continued)

FOREIGN PATENT DOCUMENTS

JP  8-305553 A  11/1996
JP  9-326186 A  12/1997
(Continued)

OTHER PUBLICATIONS

Notification of Reason for Refusal dated May 21, 2019, from Japanese Patent Application No. 2016-091147, 3 sheets.
(Continued)

*Primary Examiner* — Seong-Ah A Shin
(74) *Attorney, Agent, or Firm* — Katten Muchin Rosenman LLP

(57) ABSTRACT

A media drive 32 is loaded with a data disc 44b in which a plurality of files composing application software is recorded. A language information holding section 110 holds use language information configured to specify a use language selected by a user in the information processing apparatus 10 concerned. For causing application to be in an executable state, a recording processing section 104 copies a language-dependent file recorded in the data disc 44b to an auxiliary storage apparatus 2 on the basis of the use language information held in the language information holding section 110.

6 Claims, 10 Drawing Sheets

(51) Int. Cl.
*G06F 9/451* (2018.01)
*A63F 13/79* (2014.01)
*G06F 9/445* (2018.01)
*G06F 8/61* (2018.01)
*A63F 13/77* (2014.01)
*G06F 3/0484* (2013.01)
*G06F 12/0868* (2016.01)

(52) U.S. Cl.
CPC ............... *G06F 8/61* (2013.01); *G06F 9/445* (2013.01); *G06F 12/0868* (2013.01)

(56) References Cited

U.S. PATENT DOCUMENTS

| | | | | |
|---|---|---|---|---|
| 2008/0034031 | A1* | 2/2008 | Weisbrot | G06F 16/9574 709/203 |
| 2009/0193251 | A1* | 7/2009 | Brabson | H04L 63/0428 713/164 |
| 2009/0207704 | A1* | 8/2009 | Hirano | G11B 7/28 369/47.12 |
| 2009/0282333 | A1* | 11/2009 | Olsen | G06F 40/186 715/703 |
| 2009/0305790 | A1* | 12/2009 | Lu | A63F 13/355 463/42 |
| 2011/0032250 | A1* | 2/2011 | Tanaka | A63F 13/12 345/418 |
| 2011/0209047 | A1* | 8/2011 | Olsen | G06F 40/14 715/234 |
| 2012/0004040 | A1* | 1/2012 | Pereira | A63F 13/355 463/42 |
| 2014/0201209 | A1* | 7/2014 | Hashimoto | G06F 3/064 707/737 |

FOREIGN PATENT DOCUMENTS

| | | |
|---|---|---|
| JP | 10-207713 | 8/1998 |
| JP | 2000-176186 A | 6/2000 |
| JP | 2001-252466 A | 9/2001 |
| JP | 2004-112341 A | 4/2004 |
| JP | 2008-522302 A | 6/2008 |
| JP | 2008-194162 A | 8/2008 |
| WO | 2006/058837 A1 | 6/2006 |
| WO | 2014/111985 | 7/2014 |
| WO | 2014/111985 A1 | 7/2014 |

OTHER PUBLICATIONS

International Preliminary Report on Patentability dated Oct. 30, 2018, from International Application No. PCT/JP2017/006671, 15 sheets.

International Search Report and Written Opinion dated May 17, 2017, from International Application No. PCT/JP2017/006671, 9 sheets.

* cited by examiner

FIG.6
(a)
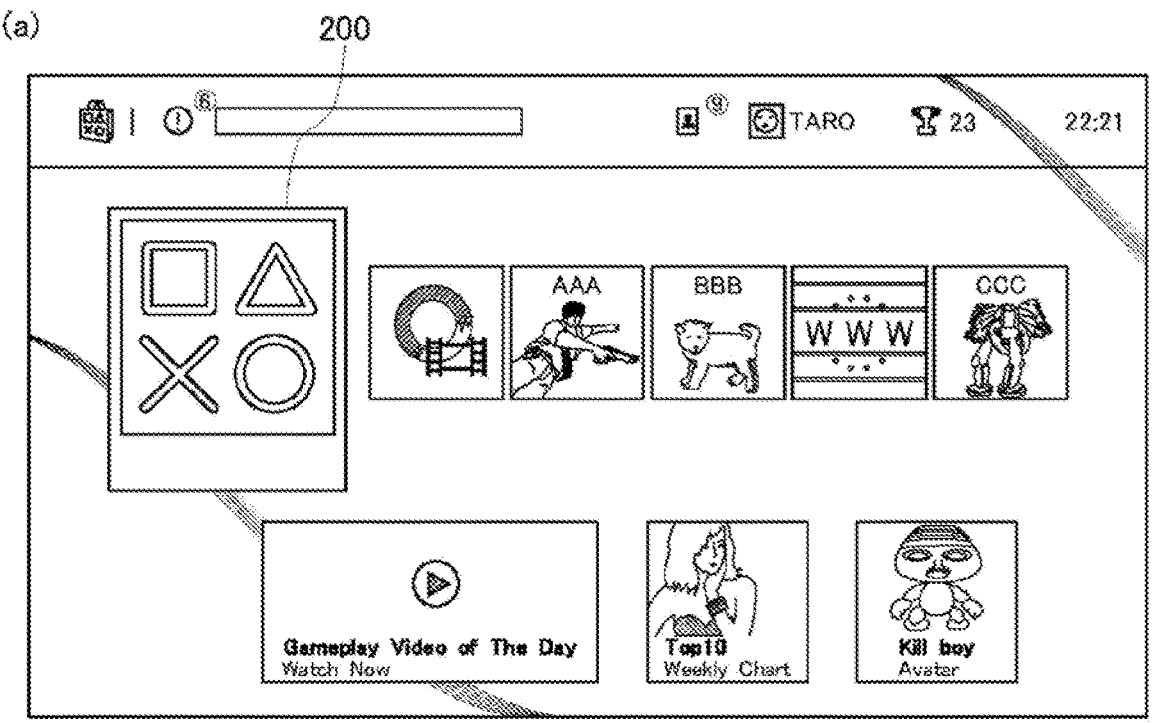
(b)
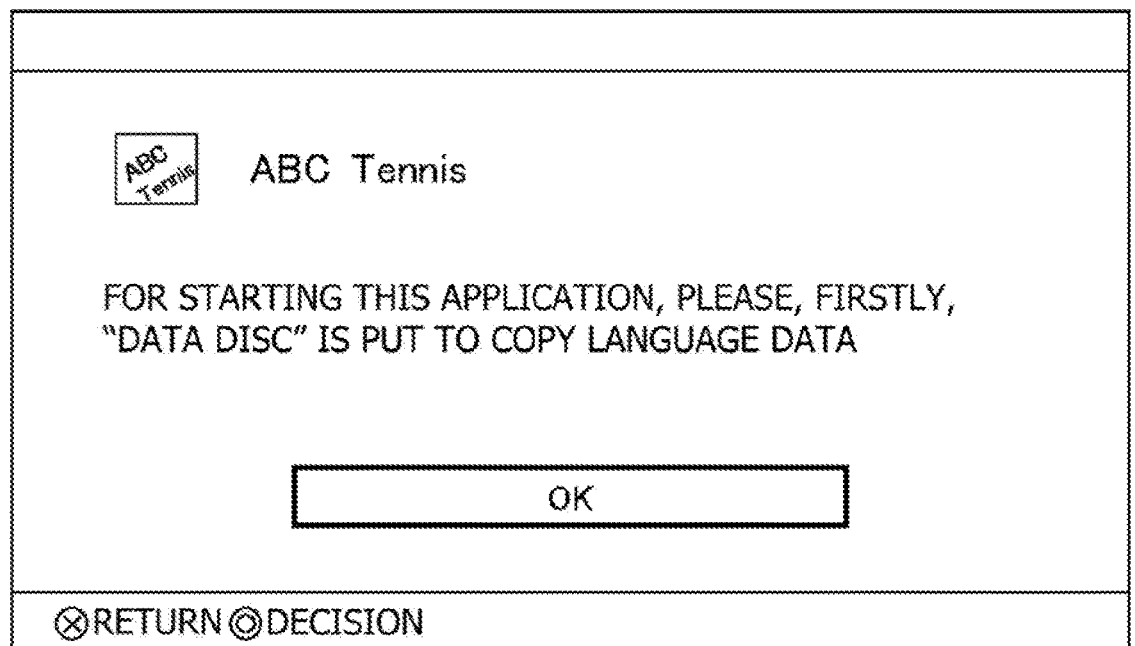

FIG.7
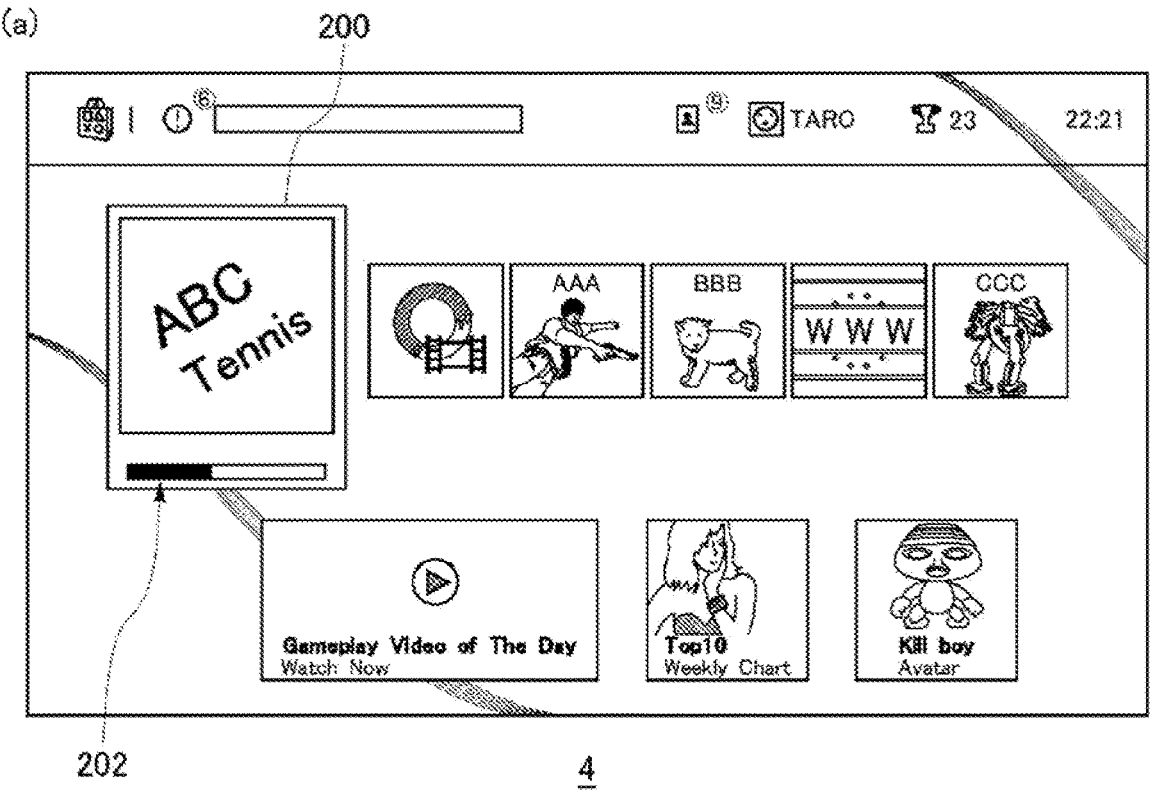
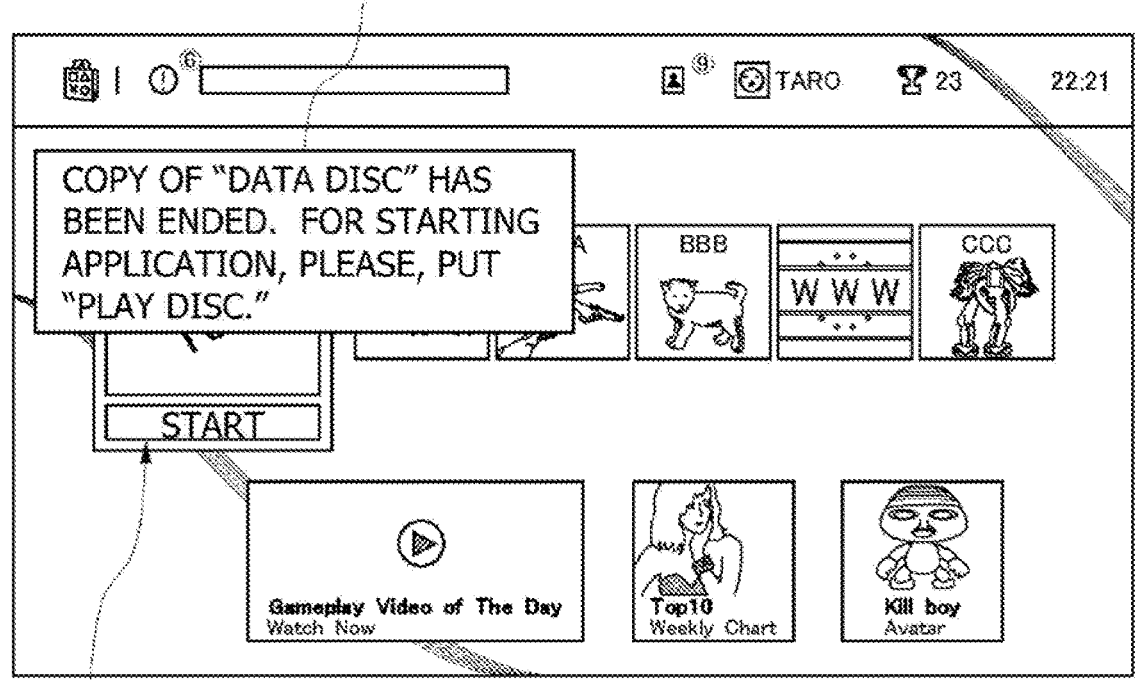

| LANGUAGE | |
|---|---|
| ⊙ SYSTEM LANGUAGE | Dansk |
| ⊙ INPUT LANGUAGE | Deutsch |
| | English(United Kingdom) |
| | English(United States) |
| | Español(América Latina) |
| | Español(España) |
| | Français(Canada) |
| | Français(France) |
| | Italiano |
| | Nederlands |
| | Norsk |
| | Polski |
| ⊗RETURN ⊚DECISION | Português(Brasil) |

4

(b)

LANGUAGE

ALL APPLICATIONS BEING EXECUTED ARE ENDED, AND CHANGED SETTING IS REFLECTED.
MAY PROCESSING BE CONTINUED?

[ NO ]   [ YES ]

⊗ RETURN   ⊚ DECISION

4

FIG.9
(a)
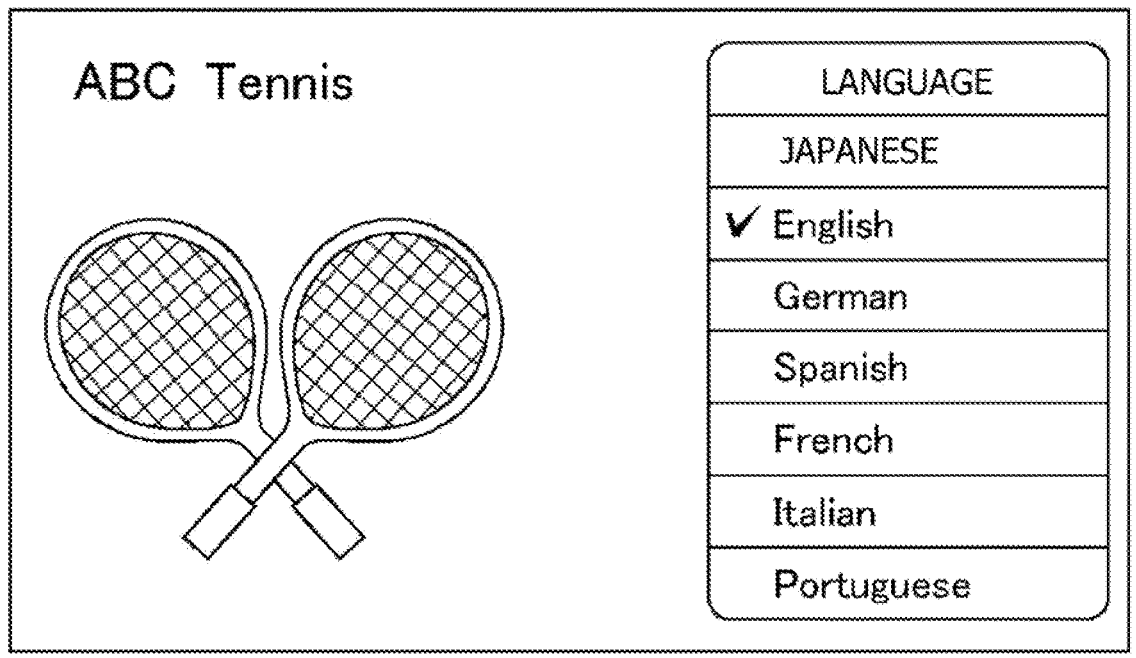
4
(b)
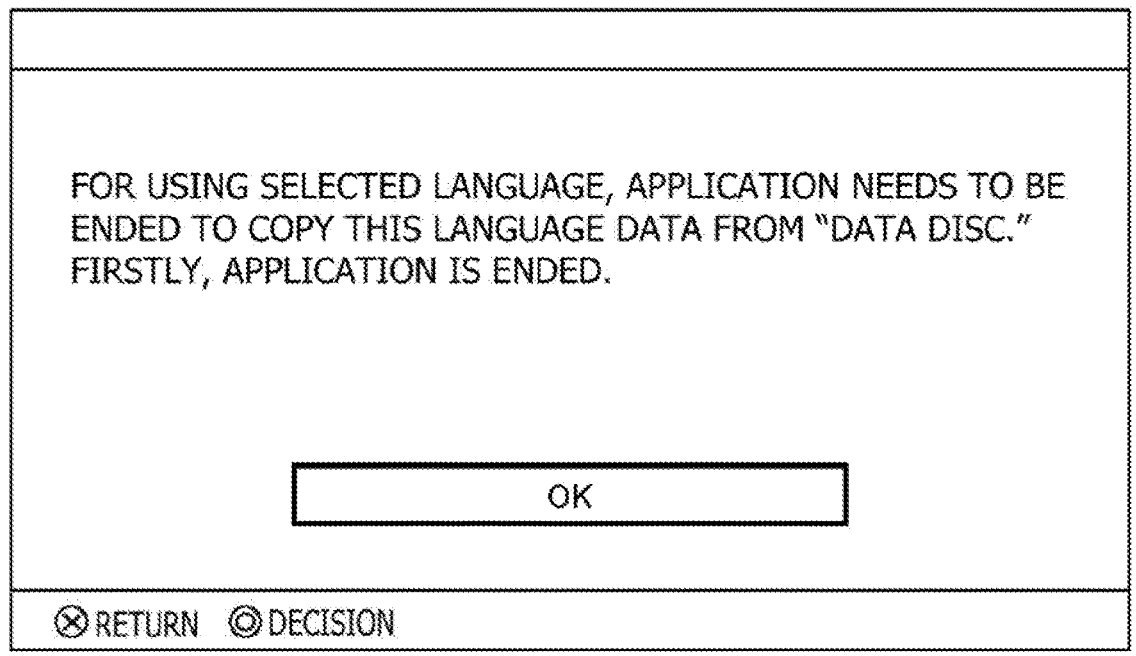
4

APPLICATION IS BEING ENDED.

⊗ RETURN

4

(b)

PREPARATION FOR COPYING SELECTED LANGUAGE HAS BEEN MADE.
PLEASE, PUT "DATA DISC."

⊗ RETURN

COPY HAS BEEN COMPLETED.
FOR STARTING APPLICATION, PLEASE, PUT "PLAY DISC."

⊗RETURN

4

INFORMATION PROCESSING APPARATUS AND DATA COPYING METHOD

TECHNICAL FIELD

The present invention relates to an information processing technique which is implemented in an information processing apparatus such as a game machine.

BACKGROUND ART

Game software includes a resource file group for playing a game such as a startup file or a game program, and a file group which an operating system (OS) of a game machine uses. In recent years, the number of files contained in the game software has been increased, and a data size has tended to be large-scaled.

PTL 1 proposes a group structure configured in such a way that game software is divided into a plurality of groups, and a program file and a data file necessary for startup of the game software belong to one group (first group) of a plurality of groups. PTL 1 discloses a technique with which while data recorded in a read-only memory (ROM) medium is read out to a buffer to be presented to a game, data thus read out is recorded in an auxiliary storage apparatus, and the data is then copied from a ROM medium as a low-speed device to the auxiliary storage apparatus as a high-speed device. At this time, the file recording is managed in units of the group, thereby enabling the copying processing to be efficiently executed.

CITATION LIST

Patent Literature

[PTL 1]
US 2014/201209A1

SUMMARY

Technical Problem

In the case where the game software is recorded in a disc medium such as an optical disc, a magneto-optical disc or a Blu-ray disc, the game software having the large data size is too large to be recorded in one sheet of disc, and is divided every scenario to fit in a plurality of sheets of discs. For this reason, when the scenario progresses, a user needs to exchange the disc in the middle of the scenario progress, which causes the user to feel a trouble as compared with the case of the download acquisition.

Incidentally, one of reasons why the data size of the game software is large-scaled is because the sound data and the image data are created in response to a plurality of languages. Hereinafter, such data will be referred to as "language-dependent" data or a "language-dependent." file. However, the data size of the language-dependent file accounts for a substantial share of the data size of the whole software.

The game until now adopts a mechanism in which the user selects a use language from a language selection screen presented after the startup of the game, and the selected language-dependent file is installed. There is especially no problem in the case where the game software is recorded in one sheet of disc. However, in the case where a plurality of sheets of discs is present, since the choices are derived in the disc to be set in a drive apparatus, the work of the user is preferably induced in such a way that the user can smoothly start the game play. In addition, even in the case where the game software fits in one sheet of disc, a mechanism with which the language-dependent file can be efficiently installed in such a way that the user can speedily start the game play is preferably presented.

In the light of the foregoing, it is an object of the present invention to provide a technique for efficiently installing a language-dependent file including a sound file.

Solution to Problem

In order to solve the problem described above, an information processing apparatus of a certain aspect of the present invention includes a drive apparatus, a language information holding section, and a processing section. In this case, the drive apparatus serves to be loaded with recording media in which a plurality of files composing application software is recorded. The language information holding section serves to hold use language information specifying a use language selected by a user in the information processing apparatus. The processing section serves to copy the files recorded in the recording media to an auxiliary storage apparatus. In addition, in order to cause an application to be in an executable state, the processing section copies the language-dependent files recorded in the recording media to the auxiliary storage apparatus on the basis of the use language information held in the language information holding section.

Another aspect of the present invention is a method of copying data from recording media to an auxiliary storage apparatus. This method includes a first step and a second step. In the first step, use language information specifying a use language selected by a user is held. In the second step, a language-dependent file is read out from a drive apparatus loaded with the recording media, in which a plurality of files composing application software is recorded on the basis of the use language information, and is copied to the auxiliary storage apparatus.

It should be used that aspects obtained by converting an arbitrary combination of the constituent elements described above, and the expression of the present invention among a method, an apparatus, a system, a recording medium, a computer program, and the like are also valid as aspects of the present invention.

BRIEF DESCRIPTION OF DRAWINGS

FIG. 6 is a view depicting an example of a display screen.

FIG. 7 is a view depicting another example of the display screen.

FIG. 8 is a view depicting still another example of the display screen.

FIG. 9 is a view depicting yet another example of the display screen.

FIG. 10 is a view depicting a further another example of the display screen.

FIG. 11 is a view depicting even further another example of the display screen.

DESCRIPTION OF EMBODIMENT

Figure 1:
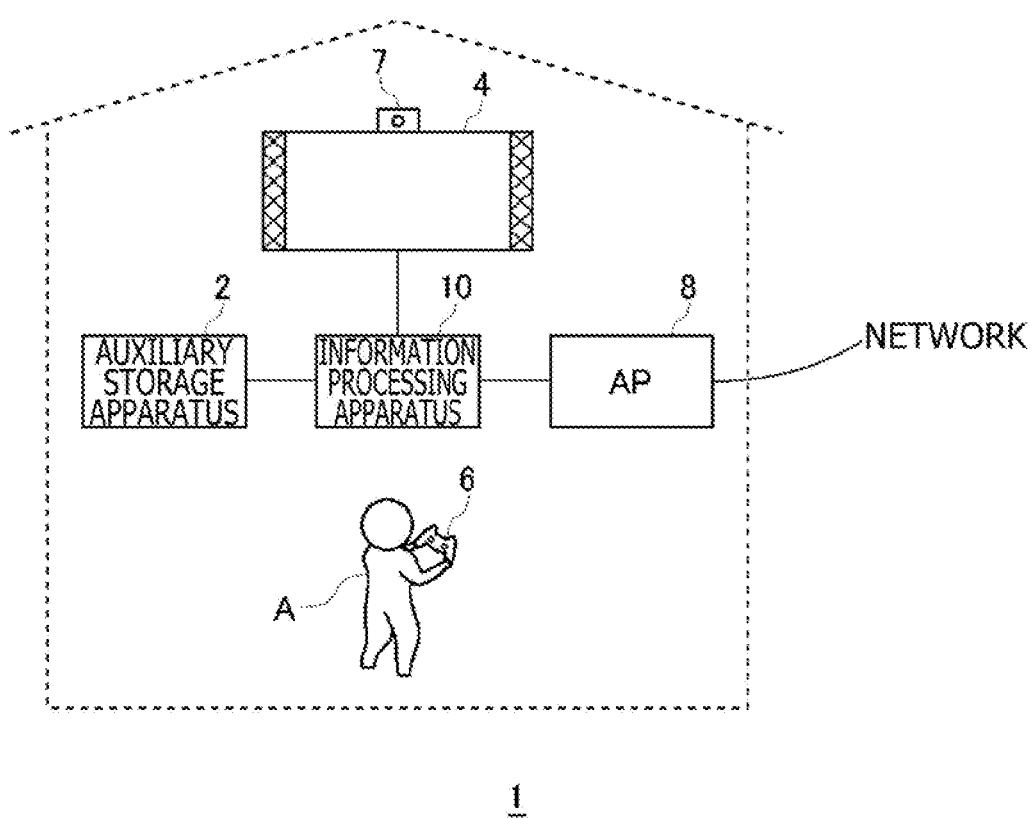
FIG. 1 is a block diagram depicting an information processing system according to an embodiment.

FIG. 1 depicts an information processing system 1 according to an embodiment of the present invention. The information processing system 1 is provided with an information processing apparatus 10, an auxiliary storage apparatus 2 and an output apparatus 4. An access point (hereinafter referred to as "an AP") 8 has a function of a wireless access point and a router. The information processing apparatus 10 is connected to the AP 8 via a wireless or wired manner to be communicably connected to a server on a network.

The information processing apparatus 10 is connected to an input apparatus 6 which a user manipulates through a wireless or wired manner. The input apparatus 6 outputs manipulation information exhibiting a result of the manipulation by the user to the information processing apparatus 10. The information processing apparatus 10 receives the manipulation information from the input apparatus 6, the information processing apparatus 10 reflects the manipulation information regarding the processing of OS (system software) or game software to cause the output apparatus 4 to output the processing result. The information processing apparatus 10 may be a terminal apparatus of a game machine for carrying out the game software, a personal computer, or the like. The input apparatus 6 may be equipment, such as a game controller, for supplying the information associated with the manipulation by the user to the information processing apparatus 10.

The auxiliary storage apparatus 2 is a large-scale storage apparatus such as a hard disc drive (HDD) or a flash memory. The auxiliary storage apparatus 2 may be an external storage apparatus which is connected to the information processing apparatus 10 through a universal serial bus (USB), or may be a built-in storage apparatus instead. The output apparatus 4 may be a television set having a display for outputting an image, and a speaker for outputting a sound, or may be a computer display. The output apparatus 4 may be connected to the information processing apparatus 10 through a wired cable, or may be connected to the information processing apparatus 10 through a wireless manner.

The input apparatus 6 is configured to have a plurality of input sections of a plurality of push type manipulation buttons, an analog stick which can input an analog amount, and a rotary button. A camera 7 as an image pickup apparatus is provided in the vicinity of the output apparatus 4, and images the space in the circumference of the output apparatus 4. Although FIG. 1 depicts an example in which the camera 7 is mounted to an upper section of the output apparatus 4, the camera 7 may also be arranged on the side of the output apparatus 4. In any case, the camera 7 is arranged in a position where the camera 7 can image the user who plays a game in the front of the output apparatus 4. The camera 7 may be a stereoscopic camera. The information processing apparatus 10 has a function of authenticating a face of the user from the captured image from the camera 7 to make login.

Figure 2:
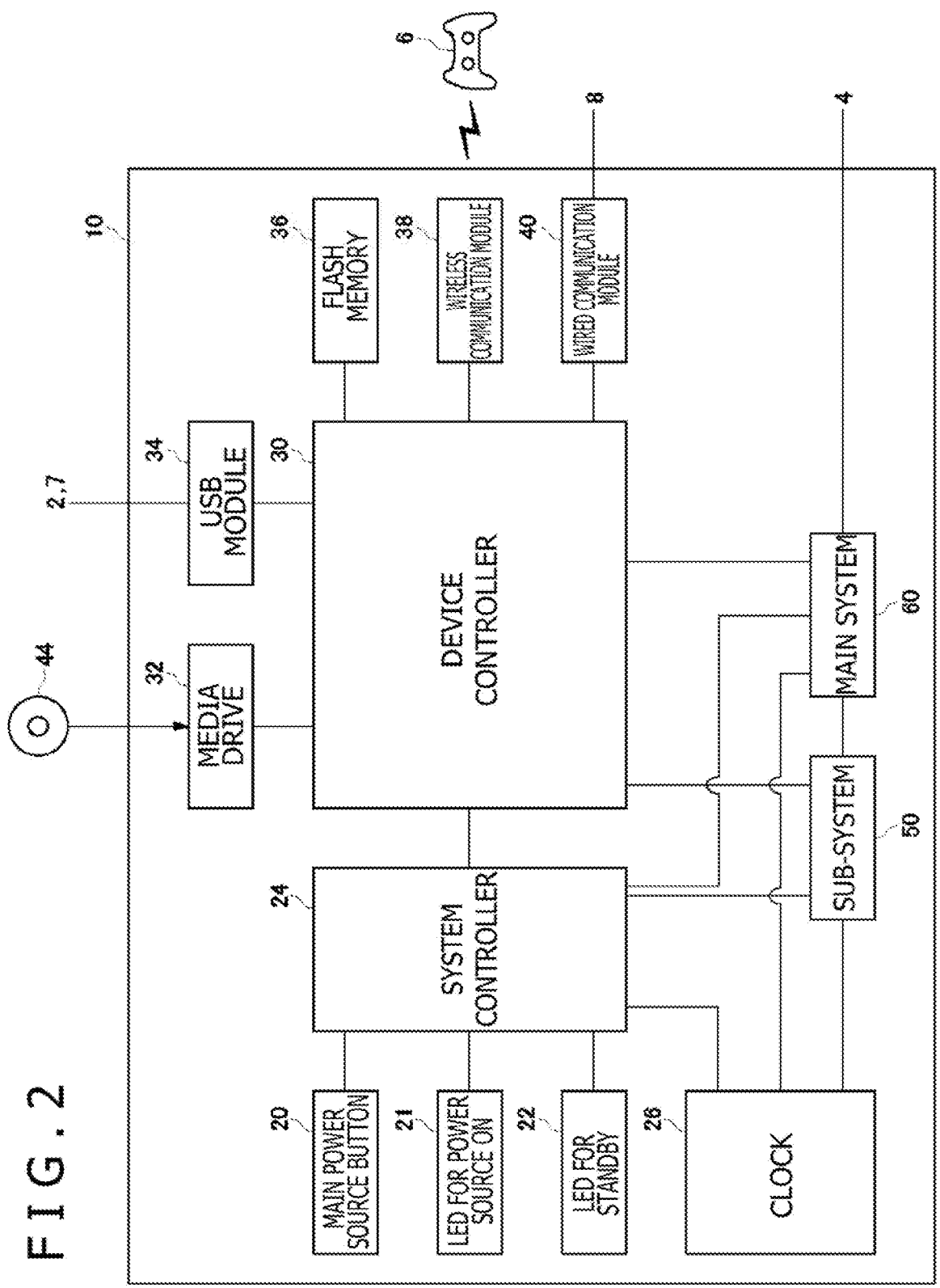
FIG. 2 is a block diagram depicting a functional block of an information processing apparatus.

FIG. 2 depicts a functional block of the information processing apparatus 10. The information processing apparatus 10 is configured to have a main power source button 20, a light-emitting diode (LED) 21 for power source ON, an LED 22 for standby, a system controller 24, a clock 26, a device controller 30, a media drive 32, a USB module 34, a flash memory 36, a wireless communication module 38, a wired communication module 40, a sub-system 50, and a main system 60.

The main system 60 is provided with a main central processing unit (CPU), a memory and a memory controller as a main storage apparatus, a graphics processing unit (GPU), and the like. The GPU is mainly utilized in arithmetic operation processing for a game program. These functions may be configured in the form of a system on-chip to be formed on one chip. The main CPU has a function of executing the game software recorded in the auxiliary storage apparatus 2 or a ROM medium 44.

The sub-system 50 is provided with a sub-CPU, a memory and a memory controller as a main storage apparatus, and the like, and is not provided with the GPU, and does not have a function of executing the game software. The number of circuit gates of the sub-CPU is smaller than the number of circuit gates of the main CPU, and the power consumption for an operation of the sub-CPU is less than the power consumption for an operation of the main CPU. The sub-CPU operates even while the main CPU is in a standby state. Then, the processing function of the sub-CPU is limited in order to suppress the power consumption to a low level.

The main power source button 20 is a button with which a manipulation input from the user is carried out. The main power source button 20 is provided on the front surface of the chassis of the information processing apparatus 10, and is manipulated in order to turn ON or OFF the power source supply to the main system 60 of the information processing apparatus 10. The LED 21 for power source ON is lighted when the main power source button 20 is turned ON, and the LED 22 for standby is lighted when the main power source button 20 is turned OFF.

The system controller 24 detects the press-down of the main power source button 20 by the user. If the main power source button 20 is pressed down when the main power source is held in an OFF state, then, the system controller 24 acquires the press-down manipulation as "an ON instruction." On the other hand, if the main power source button 20 is pressed down when the main power source is held in an ON state, then, the system controller 24 acquires the press-down manipulation as "an OFF instruction."

The clock 26 is a real-time clock, and produces the current data and time information to supply the resulting current data and time information to the system controller 24 or the sub-system 50, and the main system 60.

The device controller 30 is configured in the form of a large-scale integrated circuit (LSI) for carrying out the acceptance or delivery of information between the devices like a south bridge. As depicted in the figure, the devices such as the system controller 24, the media drive 32, the USB module 34, the flash memory 36, the wireless communication module 38, the wired communication module 40, the sub-system 50, and the main system 60 are connected to the device controller 30. The device controller 30 absorbs differences of the electric characteristics, or differences of the data transfer speeds in the respective devices, thereby controlling the timing of the data transfer.

The media drive 32 is a drive apparatus which is loaded with the ROM medium 44 in which the application software such as the game is recorded in order to drive the ROM medium 44, thereby reading out the program or the data from the ROM medium 44. Hereinafter, in the case where the program and the data are not especially distinguished from each other, the program and the data are also collectively referred to as the data in some cases. However, "the data" is used as the word expressing the element composing the file. The ROM medium 44 is read only recording media such as the optical disc, the magneto-optical disc, or the Blu-ray disc.

The USB module 34 is a module which is connected to external equipment through a USB cable. The USB module 34 may be connected to the auxiliary storage apparatus 2 and the camera 7 through the USB cable. The flash memory 36 is an auxiliary storage apparatus configuring an internal storage. The wireless communication module 38 is a communication protocol such as a Bluetooth (registered trademark) protocol or an Institute of Electrical and Electronics Engineers (IEEE) 802.11 protocol and, for example, is communicated with the input apparatus 6 in the wireless manner. It should be noted that the wireless communication module 33 may respond to a third generation digital mobile phone system complying with the international mobile telecommunication 2000 (IMT-2000) standards decided by the international telecommunication union (ITU), or may further respond to another generation digital mobile phone system. The wired communication module 40 is communicated with the external equipment in the wired manner, and is connected to the network through the AP 8.

The auxiliary storage apparatus 2 is an HDD or a flash memory. On the other hand, the media drive 32 is loaded with the ROM medium 44 and reads out the data from the ROM medium 44. It should be noted that the recording media with which the media drive 32 is loaded is by no means limited to the ROM medium 44, and may be writable recording media. When a data reading speed of the auxiliary storage apparatus 2 and a data reading speed of the media drive 32 are compared with each other, the data reading speed of the auxiliary storage apparatus 2 is relatively higher than the data reading speed of the media drive 32. Then, the information processing apparatus 10 of the embodiment, during the execution of the game, copies the data from the ROM medium 44 in the background to the auxiliary storage apparatus 2. With regard to the file for which the copy to the auxiliary storage apparatus 2 has been completed, the information processing apparatus 10 reads out the data not from the ROM medium 44, but from the auxiliary storage apparatus 2, thereby enabling the high-speed data reading to be carried out.

The game software which is recorded in the ROM medium 44 is configured to include a resource file group, such as a startup file, and a game program, for executing the game, and a file group which the OS of the information processing apparatus 10 uses. The game program is a program necessary for execution of the game, and the game progresses by the running the game program. The startup file is a program for starting up the game program. When the startup file is executed, the game program is called to be executed. The file group which the OS uses, for example, includes a game icon image or the like displayed on a menu screen in the information processing apparatus 10.

The game software has a tree type directory structure, and the start-up file is included in a route directory of the uppermost layer. The sub-directory of the lower layer is classified every kind of the file. For example, a sub-directory for a three-dimensional (3D) model, the sub-directory for texture, the sub-directory for script, and the like are formed. Each the sub-directories includes corresponding files. The sub-directory for 3D model includes a plurality of 3D model files, the sub-directory for texture includes a plurality of texture files, and the sub-directory for script includes a plurality of script files. For example, the sub-directory for texture includes a texture file for a scenario 1 of a game, a texture file for a scenario 2 of a game, a texture file for a scenario 3 of a game, and the like.

The game in the recent years is created in response to a plurality of languages in many cases. For this reason, the sound data and the image data are created every plurality of languages, and the sound files and the image files of a plurality of languages fit in one package software. Hereinafter, the sound file and the image file created every language are referred to as a language-dependent file.

In such a language-dependent file, it is known that owing to the lengthening of the game scenario, the data size of the sound file is very large. Then, the game software in the embodiment has a format having a resource file in which the sound file and the image file are assembled every language in such a way that only the language-dependent file required for the user can be installed.

The information associated with the language which is used by the user is set in the information processing apparatus 10. For example, if the user is Japanese, then, the language to be used is set to Japanese, and if the user is American, then, the language to be used is set to English. The OS of the information processing apparatus 10 holds the use language information selected by the user, and the screen such as a home screen which the OS presents is produced on the basis of the use language information.

In the past game, before the play start after the startup of the game, the user selects the use language, and the game produces the output sound and the output screen by using the selected the use language. The embodiment proposes the mechanism in which the OS automatically selects the use language in the game, and the corresponding language-dependent file is automatically installed from the ROM medium 44 to the auxiliary storage apparatus 2, thereby quickly adjusting a state in which the game can be executed.

Specifically, the information processing apparatus 10 automatically copies the resource file for the language corresponding to the use language information of the language-dependent files of a plurality of languages which are recorded in the ROM medium 44 to the auxiliary storage apparatus 2 on the basis of the use language information set in the OS. It should be noted that any of the resource files for the languages not corresponding to the use language information is not copied to the auxiliary storage apparatus 2. For example, if "Japanese" is set as the use language information of the user, then, when the media drive 32 is loaded with the ROM medium 44, the information processing apparatus 10 automatically reads out a Japanese resource file from the ROM medium 44, and copies the Japanese resource file to the auxiliary storage apparatus 2. The possibility that the user plays the game with the same language as the use language set in the information processing apparatus 10 is very high. Therefore, only the resource file for the same language as the use language of the OS is copies to the auxiliary storage apparatus 2, resulting in that the recording capacity of the auxiliary storage apparatus 2 is not wastefully consumed, and the state in which the game can be executed is rapidly adjusted.

Figure 3:
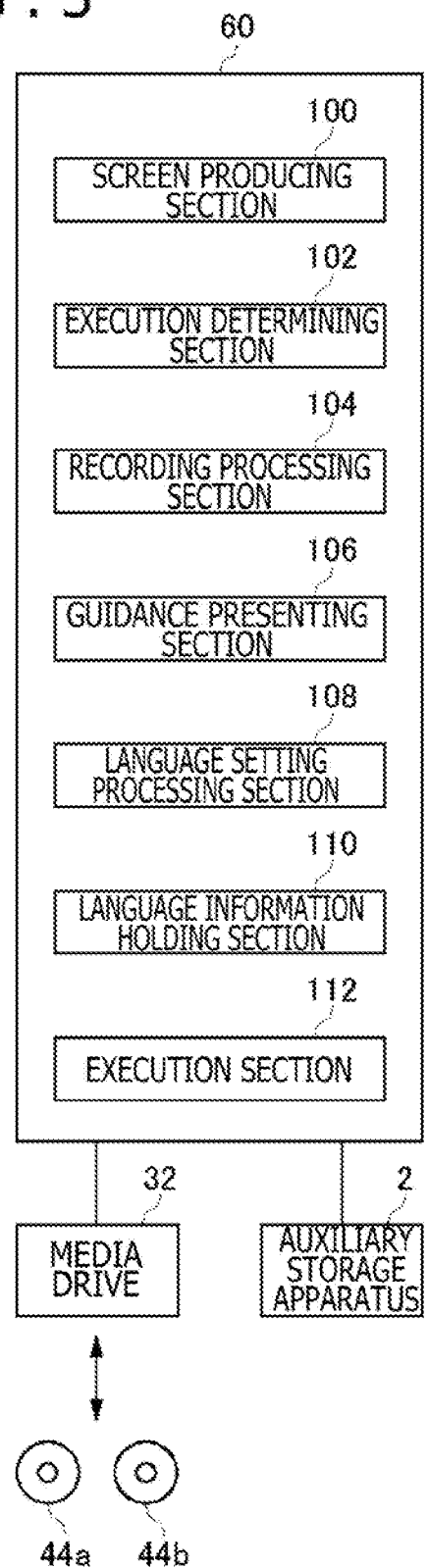
FIG. 3 is a block diagram depicting a configuration of the information processing apparatus.

FIG. 3 depicts a configuration of the information processing apparatus 10. The main system 60 is provided with a screen producing section 100, an execution determining section 102, a recording processing section 104, a guidance presenting section 106, a language setting processing section 108, a language information holding section 110, and an execution section 112. The recording processing section 104 has a function of copying the file recorded in the ROM medium 44 to the auxiliary storage apparatus 2. These configurations, in terms of hardware components, are realized by a CPU, a memory, a program loaded into the memory, a storage, and the like of an arbitrary computer. In this case, however, functional blocks realized by cooperation with those are drawn. Accordingly, it is understood by a person skilled in the art that these functional blocks can be realized in the various forms by only the hardware, only the software, or a combination thereof. It should be noted that these configurations may be realized by the function of the OS.

After the user purchases the information processing apparatus 10, he/she initializes the information processing apparatus 10. As an example, the user connects the information processing apparatus 10 to the power source through a power source cable, and connects the information processing apparatus 10 and the output apparatus 4 through a high-definition multimedia interface (HDMI) (registered trademark) cable. In this case, when the user presses the main power source button 20, the screen producing section 100 displays a guidance screen depicting a situation in which the input apparatus 6 is connected to the information processing apparatus 10 on the output apparatus 4. The user connects the input apparatus 6 as the game controller to the information processing apparatus 10 by using the USB cable. Thereafter, the screen producing section 100 displays a selection screen for the language on the output apparatus 4.

Figures 4, 5:
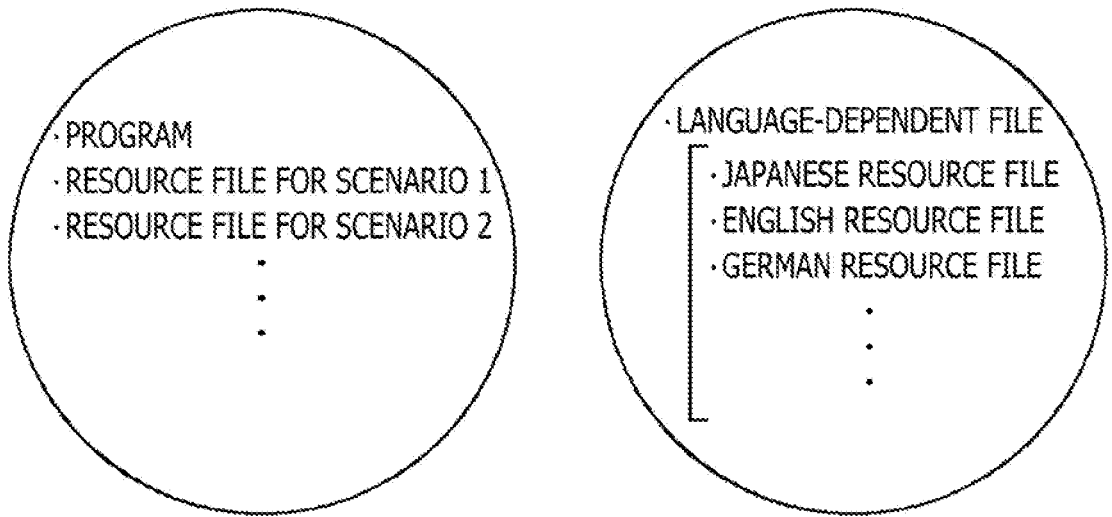
FIG. 4 is a view depicting an example of a language selection screen.
FIG. 5 is a view explaining recording files in two sheets of ROM media.

FIG. 4 depicts an example of the language selection screen to be displayed. The choices of a plurality of languages which the information processing apparatus 10 system-supports are displayed on the language selection screen. When the user selects his/her use language and manipulates the decision button of the input apparatus 6, the system language used in the information processing apparatus 10 is decided. The system language is used to decide the language structuring the system screen which the screen producing section 100 presents. For example, when Japanese is selected, the screen producing section 100 creates the system screen with Japanese. The language setting processing section 108 executes the setting processing for the system language, and the information used to specify the language selected by the user is held on the language information processing section 110 as the use language information. After that, the screen producing section 100 creates the system screen on the basis of the use language information held in the language information processing section 110.

When the system language is decided, the user carries out the work for the setup for the information processing apparatus 10 in accordance with the guidance screen which the screen producing section 100 displays on the output apparatus 4. In the setup work, the setting of the Internet connection, the connection setting of the camera 7 the setting of the date and time, and the like are carried out. These works are completed, resulting in that the information processing apparatus 10 becomes an enable state.

It should be noted that the user can change the use language set in the initial setting to a desired language at any time. The screen producing section 100 causes the output apparatus 4 to display the language selection screen in response to the request made from the user. The language setting processing section 108 records the language information selected by the user in the language information holding section 110. In such a manner, the language information holding section 110 holds the use language information used to specify the use language selected by the user in the information processing apparatus 10. When the use language is changed, the screen producing section 100 shall create the system screen in accordance with the use language after the change.

Hereinafter, the game recorded in the ROM medium 44 will be referred to as "a disc game," and a description will now be given with respect to a procedure until the disc game becomes an executable state. Incidentally, although the game software may be recorded in one sheet of ROM medium 44, in the following, a description will be given with respect to the case where the game software is recorded over a plurality of sheets of ROM media 44.

FIG. 5 is a view explaining the recording files in two sheets of ROM media 44. Although FIG. 5 depicts an example in which the game software is recorded in two sheets of recording media, the game software may be recorded in three or more sheets of recording media. Hereinafter, one sheet of recording medium is referred to as a play disc 44a, and the other one sheet of recording medium is referred to as a data disc 44b to be distinguished from each other.

A file group of the program, the scenario resource file, and the like is recorded in the play disc 44a. In addition, the language-dependent files of a plurality of languages are recorded in the data disc 44b. For example, in case of the game software responding to ten kinds of languages, ten kinds of language-dependent files are recorded in the data disc 44b. It should be noted that the language-dependent file of the language (for example, English) which the game maker sets as a default language may not be recorded in the data disc 44b, but may be especially recorded in the data disc 44a.

In the disc structure depicted in FIG. 5, the resource file group necessary for the game progress is recorded in the play disc 44a, and the language-dependent file having the large data size is recorded in the data disc 44b. The reason for this is because the image is operated only by the play disc 44a as long as before the game startup, the media drive 32 is loaded with the data disc 44b, only the language-dependent file necessary for the user is automatically copied to the auxiliary storage apparatus 2, and thereafter, the language is not changed. In a word, the media drive 32 is loaded with the data disc 44b only once before the game startup, the data disc 44b is used for reading out the language-dependent file for predetermined one language to the auxiliary storage apparatus 2, and thereafter is not used unless the language is changed.

Therefore, although the game software is recorded in a plurality of sheets of ROM media 44, since the data disc 44b is used only before the game is started up, firstly, and thereafter, the play disc 44a is used, the work for exchanging the disc in the middle of the game becomes unnecessary. Incidentally, in the information processing apparatus 10 of the embodiment, when the media drive 32 is loaded with the play disc 44a after completion of the automatic copy of the language-dependent file, all the files in the play disc 44a are copied to the auxiliary storage apparatus 2 by using the copy processing technique disclosed in PTL 1. For this reason, when a lapse of certain time after the media drive 32 is loaded with the play disc 44a, the files necessary for the game progress are arranged in the auxiliary storage apparatus 2. At this time, the execution section 112 reads out the game data from the auxiliary storage apparatus 2, but does not read out the game data from the play disc 44a. However, the information processing apparatus 10 is configured in such a way that the right information is recorded in the play disc 44a, and thus the execution section 212 cannot execute the game unless the state in which the media drive 32 is loaded with the play disc 44a is obtained.

Hereinafter, a description will be given with respect to an operation of the information processing apparatus 10 when a disc game entitled "ABC Tennis" is started up by using a display screen of the input apparatus 6.

FIG. 6(a) depicts an example of a home screen. Contents icons of the installed applications are arranged on the home screen. The contents icon arranged on a focus area 200 is selected by manipulating the decision button of the input apparatus 6 by the user, and the execution section 112 starts up the application corresponding to the contents icon.

When the user desires to start up "ABC Tennis" for the first time to cause the media drive 32 to be loaded with the play disc 44a, a guidance screen depicted in FIG. 6(b) is displayed on the output apparatus 4. The guidance presenting section 106 presents the guidance for causing the disc game to be in an executable state to the user.

FIG. 6(b) depicts an example of the guidance screen. In the embodiment, for causing the disc game to be in an executable state, firstly, processing for copying the language-dependent file to the auxiliary storage apparatus 2 is required. When the media drive 32 is loaded with the play disc 44a, the execution determining section 102 determines whether the language-dependent file is recorded in the play disc 44a. At this time, the execution determining section 102 specifies the system language set by the user from the use language information held in the language information holding section 110, and determines whether the language-dependent file of the same language as the system language is recorded in the play disc 44a. Incidentally, as described above, although in a plurality of sets of disc games, basically, any of the language-dependent files is not recorded in the play disc 44a, exceptionally, the language-dependent file of the default language is recorded in the play disc 44a in some cases.

In the case where the language-dependent file of the same language as the system language set in the language information holding section 110 is recorded in the play disc 44a, the recording processing section 104 copies the language-dependent file of the language concerned to the auxiliary storage apparatus 2. After completion of the copy of the language-dependent file by the recording processing section 104, the ABC Tennis game becomes the executable state.

On the other hand, if the language-dependent, file of the same language as the system language is not recorded in the play disc 44a, then, the execution determining section 102 determines that the language-dependent file concerned cannot be copied from the play disc 44a to the auxiliary storage apparatus 2, and informs the guidance presenting section 106 of this effect. In response to this information, the guidance presenting section 106 produces the guidance screen depicted in FIG. 6(b).

When the user looks at the guidance message depicted in FIG. 6(b), after the user manipulates the decision button of the input apparatus 6, he/she takes out the play disc 44a with which the media drive 32 is loaded, and causes the media drive 32 to be loaded with the data disc 44b instead. When the media drive 32 is replaced with the data disc 44b, the execution determining section 102 confirms that the language-dependent file of the same language as the system language is recorded in the data disc 44b. Then, the recording processing section 104, for causing the ABC Tennis game to be in the executable state, copies the language-dependent file concerned to the auxiliary storage apparatus 2. For example, in the case where "Japanese" is set in the system language, the recording processing section 104 copies the language-dependent file of Japanese from the data disc 44b to the auxiliary storage apparatus 2.

FIG. 7(a) depicts an example of a home screen in which the language-dependent file is being copied. While the recording processing section 104 copies the language-dependent file from the data disc 44b to the auxiliary storage apparatus 2, a progress bar 202 exhibiting the state of progress of the copy is displayed.

FIG. 7(b) depicts an example of the home screen after completion of the copy. When the copy of the language-dependent file has been completed, the recording processing section 104 informs the screen producing section 100 of completion of the copy. The screen producing section 100 switches the display of the progress bar 202 over to the display of a start button 204. At this time, the guidance presenting section 106 superimposes a guidance message 206 on the home screen. This guidance message 206 serves to inform the user of that the game can be started when the media drive 32 is loaded with the play disc 44a. When the user takes out the data disc 44b from the media drive 32, and loads the media drive 32 with the play disc 44a, the execution section 112 reads out the game program to start up the ABC Tennis game.

In such a way, according to the information processing apparatus 10 of the embodiment, when the media drive 32 is loaded with the data disc 44b, the recording processing section 104 automatically copies the language-dependent file of the game software on the basis of the use language information held in the language information holding section 110. For this reason, as compared with the case where after the user selects the use language in the game, the language-dependent file of the selected language is installed, the installation of the language-dependent file can be smoothly carried out. In addition, in the case where the game software is recorded in a plurality of sheets of discs in a division manner, a plurality of sheets of discs is divided into the play disc 44a for execution of the game, and the data disc 44b for recording of the language-dependent file. Therefore, if firstly, the language-dependent file is read out from the data disc 44b to the auxiliary storage apparatus 2, then, after that, the data disc 44b may not be used, and the work for exchanging the disc in the middle of the game is unnecessary.

Incidentally, when the user desires to start up "ABC Tennis" for the first time and loads the media drive 32 with the data disc 44b in which the language-dependent file of the same language as the system language is recorded, the guidance screen depicted in FIG. 6(b) is not displayed. In this case, the recording processing section 104 immediately copies the language-dependent file of the same language as the system language from the data disc 44b to the auxiliary storage apparatus 2, and the progress bar 202 depicted in FIG. 7(a) shall be displayed on the output apparatus 4.

The user can change the use language in the initial setting over to the desired language at any time. For this reason, after the language-dependent file is automatically copied from the data disc 44b to the auxiliary storage apparatus 2, the user changes the system language in some cases. Hereinafter, a description will be given with respect to an operation in the case where the user changes the system language in the state in which the media drive 32 is loaded with the play disc 44a of the ABC Tennis game.

FIG. 8(a) depicts an example of a language selection screen presented by the screen producing section 100. The screen producing section 100 displays the language selection screen on the output apparatus 4 in response to the request made from the user. It should be noted that since there is the state in which "Japanese" is selected as the system language in this example, the language selection screen is created with Japanese. When in the language selection screen, the user selects the language other than Japanese, for example, "English (United States)," and manipulates the decision button of the input apparatus 6, the screen producing section 100 displays a confirmation screen for confirming whether all the applications being executed should be ended on the output apparatus 4.

FIG. 8(*b*) depicts an example of the confirmation screen presented by the screen producing section 100. Here, when the user selects "YES" and manipulates the decision button of the input apparatus 6, the language setting processing section 108 records the selected language information in the language information holding section 110, and the ABC Tennis game is ended in a state in which the media drive 32 is loaded with the play disc 44*a* of the ABC Tennis game.

At this time, the system language is changed to "English," and only the language-dependent file of Japanese is copied to the auxiliary storage apparatus 2. The play disc 44*a* is in a state in which the media drive 32 is loaded with the play disc 44*a*, and the execution determining section 102 determines that the language-dependent file of the same language as the system language is not copied to the auxiliary storage apparatus 2. At this time, if the language-dependent file of the system language (English) after the change is recorded in the play disc 44*a*, then, the recording processing section 104 copies the language-dependent file of English recorded in the play disc 44*a* to the auxiliary storage apparatus 2. In the case where the use language information held in the language information holding section 110 is changed in such a manner, the recording processing section 104 executes the processing for automatically copying the language-dependent file to the auxiliary storage apparatus 2 on the basis of the use language information after the change.

On the other hand, if the language-dependent file of the language (English) after the change is not recorded in the play disc 44*a*, then, the guidance presenting section 106 displays the guidance screen depicted in FIG. 6(*b*) to urge the user to load the media drive 32 with the data disc 44*b*. In the case where the use language information held in the language information holding section 110 is changed in such a manner, the guidance presenting section 106 presents the guidance to the user so as to load the media drive 32 with the data disc 44*b* in which the language-dependent file is recorded. When the media drive 32 is loaded with the data disc 44*b*, the recording processing section 104 automatically copies the language-dependent file of English from the data disc 44*b* to the auxiliary storage apparatus 2. When the copy has been completed, as depicted in FIG. 7(*b*), the guidance presenting section 106 superimposes the guidance message 206 on the home screen. When the user takes out the data disc 44*b* from the media drive 32, and loads the media drive 32 with the play disc 44*a* instead, the execution section 112 reads out the game program to start up the ABC Tennis game.

The processing for automatically copying the language-dependent file to the auxiliary storage apparatus 2 on the basis of the system language by the recording processing section 104 has been described so far. In the information processing apparatus 10, the OS may have a function of causing the user to select the language to be used in the application. In this case as well, the recording processing section 104 automatically copies the corresponding language-dependent file to the auxiliary storage apparatus 2 on the basis of the language which the user selects in the language selection screen of the game presented by the OS.

Next, a description will now be given with respect to an operation when the use language is changed from the language selection screen presented by the game after the ABC Tennis game has been started up. It should be noted that the information processing apparatus 10 is in the state in which the language-dependent file of Japanese is copied to the auxiliary storage apparatus 2, and the media drive 32 is loaded with the play disc 44*a*, thereby starting up the ABC Tennis game.

FIG. 9(*a*) depicts an example of a language selection screen in the game. This language selection screen is presented by the game, and thus the user can set the language to be used in the game from the language selection screen. In this case, there is depicted an example in which "English" is selected.

When English is selected as the use language in the game, the game informs the execution determining section 102 of the selected language information. The execution determining section 102 determines whether the language-dependent file of the same language as the language in the informed language information (in a word, the language-dependent file of English) is already copied to the auxiliary storage apparatus 2.

In the case where the language-dependent file of the same language as the language selected in the game is already copied to the auxiliary storage apparatus 2, the execution determining section 102 determines that the ABC Tennis game is continuously executable. As a result, the user can continuously play the game.

On the other hand, in the case where the language-dependent file of the same language as the language selected in the game is not already copied to the auxiliary storage apparatus 2, the execution determining section 102 determines whether the language-dependent file concerned is recorded in the play disc 44*a*. In the case where the language-dependent file of the same language as the selected language is recorded in the play disc 44*a*, the recording processing section 104 copies the language-dependent file of the language concerned to the auxiliary storage apparatus 2. After completion of the copy of the language-dependent file by the recording processing section 104, the ABC Tennis game becomes the executable state, and the user can start the game play again.

On the other hand, if the language-dependent file of the same language as the system language is not recorded in the play disc 44*a*, the execution determining section 102 determines that the language-dependent file concerned cannot be copied from the play disc 44*a* to the auxiliary storage apparatus 2, and informs the guidance presenting section 106 of this effect. In response to this information, the guidance presenting section 106 produces the guidance screen depicted in FIG. 9(*b*).

When in the guidance screen depicted in FIG. 9(*b*), the user manipulates the decision button of the input apparatus 6, the processing for ending the ABC Tennis game is executed. FIG. 10(*a*) depicts an example of the end screen displayed during the game end. When the ABC Tennis game is ended, the guidance presenting section 106 produces the guidance screen depicted in FIG. 10(*b*).

When the user looks at the guidance message depicted in FIG. 10(*b*), the user takes out the play disc 44*a* with which the media drive 32 is loaded, and loads the media drive 32 with the data disc 44*b* instead. When the media drive 32 is loaded with the data disc 44*b*, the execution determining section 102 confirms that the language-dependent file of the same language as the selected language (in this case, English) is recorded in the data disc 44*b*. Then, the recording processing section 104 copies the language-dependent file concerned to the auxiliary storage apparatus 2.

FIG. 11 depicts an example of a guidance screen displayed after completion of the copy. When the recording processing section 104 has completed the copy of the language-dependent file of English, the guidance presenting section 106 displays the guidance screen depicted in FIG. 11 on the output apparatus 4. The user loads the media drive 32 with the play disc 44a of the ABC Tennis game, and the execution section 112 starts up the ABC Tennis game.

It should be note that although the user selects the language in the language selection screen (refer to FIG. 9(a)) presented from the game, and temporarily ends the ABC Tennis game, after that, the user desires to cancel, the selected language in same cases. For example, such a case is given that when in the guidance screen depicted in FIG. 10(b), the user tries to load the media drive 32 with the data disc 44b, the data disc 44b cannot be found. When in FIG. 10(b), the user manipulates the return button of the input apparatus 6, the screen producing section 100 displays the home, screen on the input apparatus 6. However, the user may be able to cancel the language selection from the home screen. As a result, the user can start the game again with the previous language (Japanese).

It is understood by a person skilled in the art that the above embodiment is merely an exemplification, and various modified changes can be made in the constituent elements thereof and in a combination of processing processes, and such modified changes fall within the scope of the present invention. Although in the embodiment, the game is explained as an example of the application, any of applications other than the game may also be available.

Although in the embodiment, it is explained that the recording processing section 104 automatically copies the language-dependent file of the same language as the system language to the auxiliary storage apparatus 2, the recording processing section 104 does not have the language-dependent file of the same language as the system language depending on some pieces of game software. In such a case, the recording processing section 104 may automatically copy the language-dependent file of the language set as the default language in the game to the auxiliary storage apparatus 2.

Although FIG. 5 depicts the example in which the game software is recorded in two sheets of recording media, the game software may be recorded in three or more sheets of recording media. For example, the data disc 44b in which the language-dependent file is recorded may be composed of a plurality of sheets of ones. In addition, the play disc 44a in which the main program or the resource file for scenario is recorded may be composed of a plurality of sheets of ones.

REFERENCE SIGNS LIST

1 . . . Information processing system, 2 . . . Auxiliary storage apparatus, 4 . . . Output apparatus, 6 . . . Input apparatus, 10 . . . Information processing apparatus, 60 . . . Main system, 100 . . . Screen producing section, 102 . . . Execution determining section, 104 . . . Recording processing section, 106 . . . Guidance presenting section, 108 . . . Language setting processing section, 310 . . . Language information holding section, 112 . . . Execution section

INDUSTRIAL APPLICABILITY

The present invention can be utilized in a technical field for copying data.

The invention claimed is:

1. An information processing apparatus, comprising:
a drive apparatus for receiving recording media,
wherein the recording media are optical discs,
wherein a first recording media is a first optical disc comprising language-dependent files for an application program,
wherein a second recording media is a second optical disc that does not include language-dependent files for the application program, and
wherein the second recording media comprises a plurality of files of the application program;
a language information holding section configured to hold use language information specifying a use language selected by a user in the information processing apparatus;
a processing section configured to copy the files recorded in the recording media to an auxiliary storage apparatus; and
a guidance presenting section configured to present guidance to the user to first insert the first recording media before insertion of the second recording media,
wherein for causing the application program to be in an executable state, the processing section copies the language-dependent files from the first recording media to the auxiliary storage apparatus on the basis of the use language information held in the language information holding section before the processing section copies any of the plurality of files from the second recording media, and
wherein, in a case where the drive apparatus is loaded with the first recording media, the processing section automatically copies the language-dependent files to the auxiliary storage apparatus.

2. The information processing apparatus according to claim 1, wherein in a case where the use language information held in the language information holding section is changed, the processing section copies the language-dependent files related to the changed use language information from the first recording media.

3. The information processing apparatus according to claim 2, wherein the guidance presenting section presents guidance to the user instructing the user to load the first recording media into the drive apparatus if the first recording media is not in the drive apparatus.

4. The information processing apparatus according to claim 1, wherein the guidance presenting section is realized by an operating system.

5. A method of copying data from recording media to an auxiliary storage apparatus, the data copying method comprising ordered steps of:
holding use language information specifying a use language selected by a user;
presenting guidance to a user in such a way that an optical drive apparatus is loaded with a first optical disc on which a language-dependent file is recorded;
determining if the optical drive apparatus is loaded with the first optical disc;
reading out the language-dependent file from the optical drive apparatus loaded on the basis of the use language information;
automatically copying the language-dependent file to the auxiliary storage apparatus;
presenting guidance to the user to load the optical drive apparatus with a second optical disc on which the language-dependent file is not recorded; and copying data from the second optical disc to the auxiliary storage apparatus.

6. A non-transitory computer readable medium having stored thereon a program for a computer, the program comprising:

by a language information holding section, holding use language information specifying a use language selected by a user in the computer;

by a guidance presenting section, presenting guidance to the user to load an optical drive apparatus with a first optical disc on which a language-dependent file is recorded; and by a processing section, reading out the language-dependent file from the optical drive apparatus on the basis of the use language information;

automatically copying the language-dependent file to the auxiliary storage apparatus;

by the guidance presenting section, presenting guidance to the user to load the optical drive apparatus with a second optical disc on which the language-dependent file is not recorded; and copying data from the second recording media to the auxiliary storage apparatus.

\* \* \* \* \*